Feb. 19, 1924.　1,484,281
A. W. STEIGER
COMBINED TYPEWRITING AND COMPUTING MACHINE
Filed Nov. 30, 1920　6 Sheets-Sheet 1

INVENTOR:
Andrew W Steiger
BY B.C. Stickney
ATTORNEY.

Feb. 19, 1924. 1,484,281
A. W. STEIGER
COMBINED TYPEWRITING AND COMPUTING MACHINE
Filed Nov. 30, 1920   6 Sheets-Sheet 2

INVENTOR:
Andrew W Steiger
BY
Attorney.

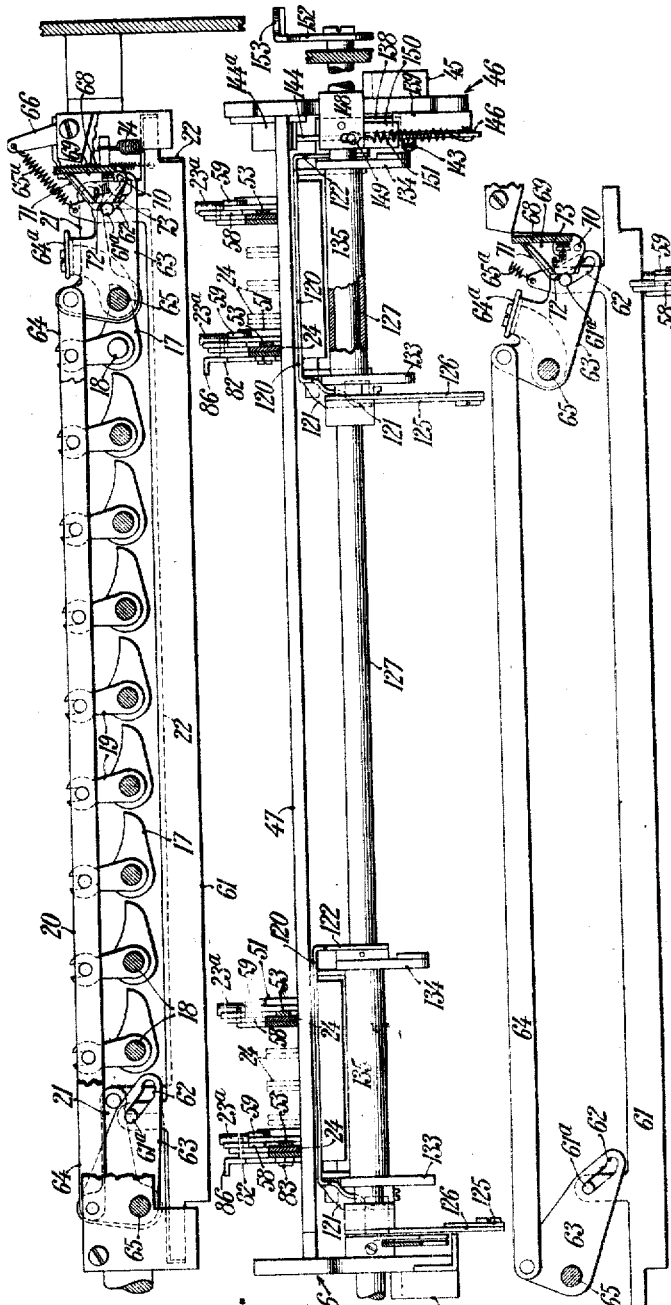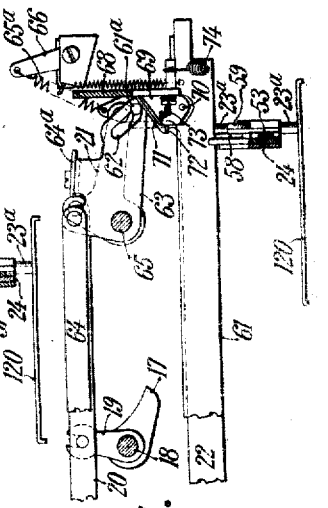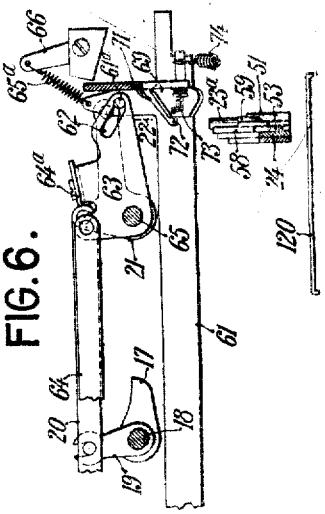

Feb. 19, 1924.
1,484,281
A. W. STEIGER
COMBINED TYPEWRITING AND COMPUTING MACHINE
Filed Nov. 30, 1920   6 Sheets-Sheet 5
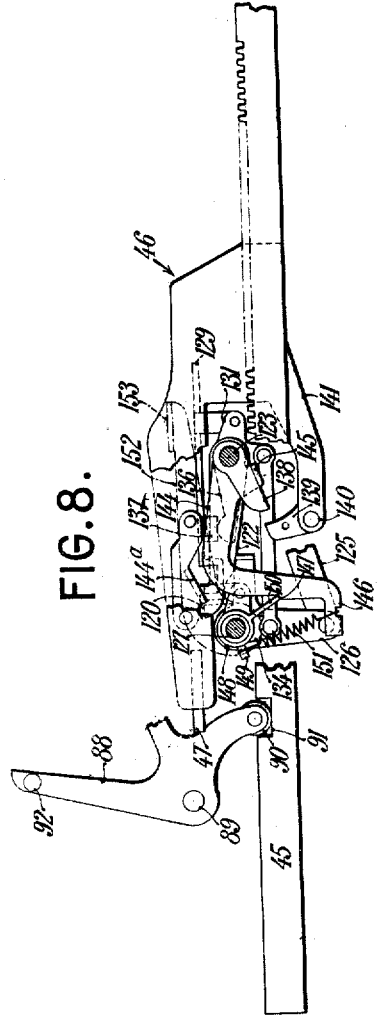
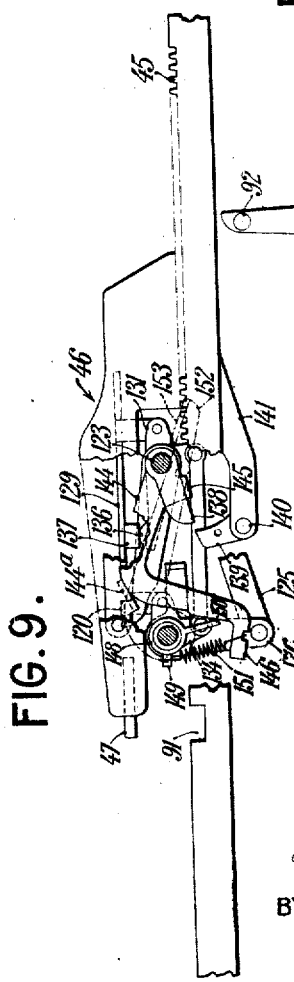
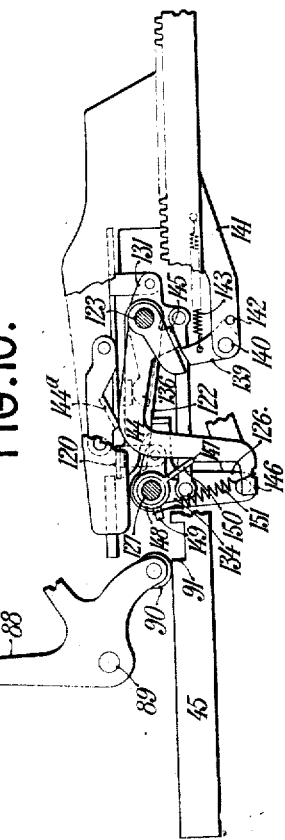
INVENTOR:
Andrew W Steiger
BY B C Stickney
ATTORNEY.

Feb. 19, 1924

A. W. STEIGER 1,484,281

COMBINED TYPEWRITING AND COMPUTING MACHINE

Filed Nov. 30, 1920      6 Sheets-Sheet 6

INVENTOR:
Andrew W Steiger
BY B C Stickney
ATTORNEY.

Patented Feb. 19, 1924.

1,484,281

UNITED STATES PATENT OFFICE.

ANDREW W. STEIGER, OF HARTFORD, CONNECTICUT, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed November 30, 1920. Serial No. 427,289.

*To all whom it may concern:*

Be it known that I, ANDREW W. STEIGER, a citizen of the United States, residing in Hartford, in the county of Hartford and State of Connecticut, have invented certain new and useful Improvements in Combined Typewriting and Computing Machines, of which the following is a specification.

This invention relates to computing mechanism, and more particularly to improvements in computing mechanism settable either for addition or subtraction.

The machine, in connection with which these improvements are shown, is of the Underwood-Hanson type, in which, when set for addition, the number to be computed is first set up in a nest of index pins digit by digit, and subsequently run up on the computing or dial wheels of the corresponding register by means of a general operator. Although, as herein disclosed, two registers are provided, a larger number of registers may be used.

Usually in a machine of this type when the same is set for subtraction, the pins set up are the complements of those which would be set up for addition, and actuation of the general operator runs up additively on said computing wheels the complement of the number to be computed, and thus effects subtraction by the complementary subtraction method.

In the embodiment of the invention herein disclosed, the number to be subtracted is indexed on identically the same pins as for addition, but provision is made whereby upon operation of the general operator the pins indexed will have idle movements corresponding to their values, such idle movements will be followed by active movements corresponding to the complements of the pins indexed, and complementary subtraction will thus be effected.

Another feature of the invention involves a device for resetting the computing mechanism for addition after the number has been indexed with the mechanism set for subtraction. It will be seen that actuation of the general operator, following such resetting, will run up additively in the corresponding register the number indexed. In case the machine is provided with a number of registers, a resetting device of this kind is used in connection with the actuating means for each register.

Provision is also made of means for resetting all of the index pins to normal position regardless of the number of registers used. This is in addition to error-key-controlled mechanism whereby all of the index pins associated with any one register may be reset to normal position entirely independently of those associated with any other register.

Other features and advantages will hereinafter appear.

In the accompanying drawings,

Figure 4 is a fragmentary rear elevation, partly in section, of the linkage for setting the special pins and releasing the latches, said linkage being in inoperative position.

Figure 5 is a veiw of the linkage, shown in Figure 4, with the parts in an intermediate position immediately after the tripping of the subtraction-setting device.

Figure 6 is a view of the parts at the right of Figure 5, showing their positions after completion of the subtracting-setting operation.

Figure 7 is a view of the parts shown in Figure 6, but showing the change in their positions due to the actuation of a pin-setting linkage.

Figure 8 is a side view of the pin-restoring devices, showing the parts in normal position.

Figure 9 is a view similar to Figure 8, but showing the position of the parts after actuation of the handle of the universal pin restoring device.

Figure 10 is a view similar to Figure 8, but showing the parts in the process of being reset by the general operator.

Figure 11 is a side elevation of a register bar and its associated pin-cage with co-operating parts in section, showing the special pin in depressed position and showing one of the other pins with its setting just completed and the corresponding latch just released.

Figure 12 is a view similar to Figure 11, but with the pin-cage at the end of its idle movement under control of the general operator.

Figure 13 is a view similar to Figure 11, but with the register bar driven forward to the end of its stroke by the general operator.

Figure 1:
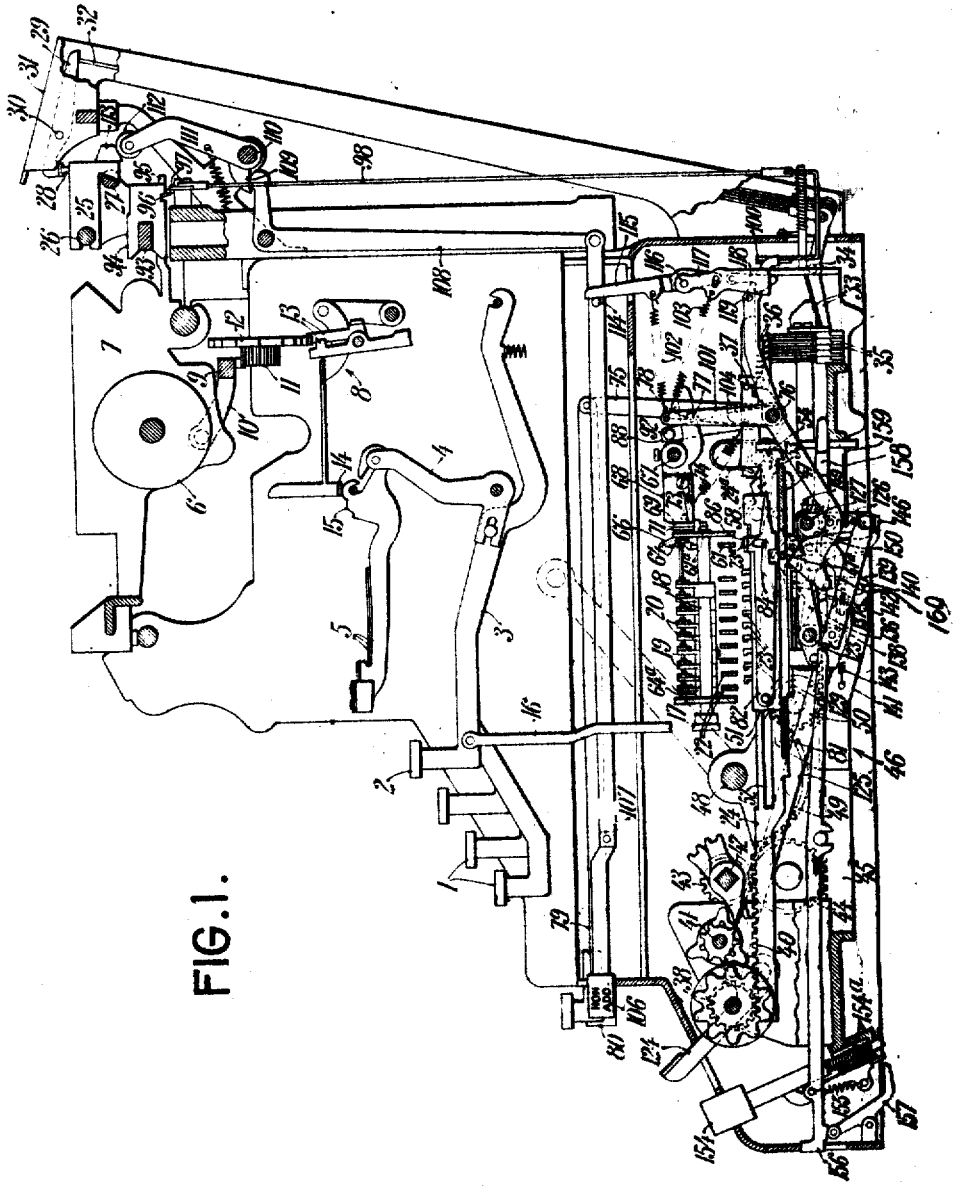
Figure 1 is a part-sectional side elevation of a combined typewriting and computing machine of the Underwood-Hanson type, showing the present improvements applied thereto.
Figure 2:
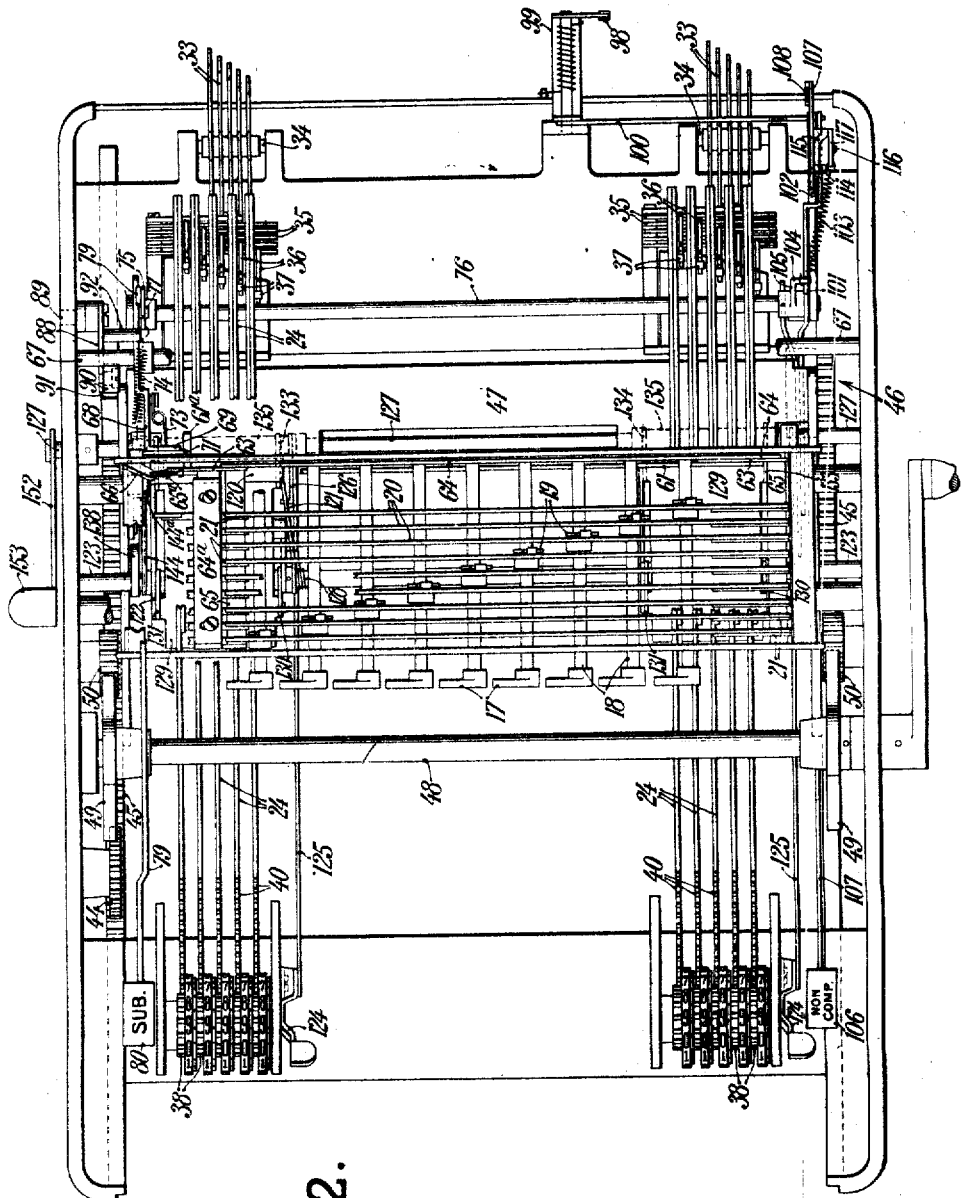
Figure 2 is a plan of the computing mechanism with parts omitted.

Alphabet keys 1 and numeral keys 2 serve to actuate key levers 3, which, through bell-cranks 4, swing type-bars 5 against the front of a platen 6 rotatably mounted on carriage 7. Said carriage has a step-by-step movement under control of an escapement mechanism, indicated in general at 8, which is released at each actuation of an alphabet or a numeral key. In said escapement mechanism, a rack bar 9, carried by arms 10, pivoted on carriage 7, meshes with a pinion 11 having a usual one-way driving connection with escapement wheel 12, which is controlled by the usual dogs 13. The movement of dogs 13 is effected through connections with universal frame 14 which is actuated at the end of the stroke of any of the type-bars by a heel 15 carried thereby.

In the present invention, as is usual in machines of this type, a preliminary setting up of the numbers to be computed is effected. To this end, a bar 16 is pivotally suspended from each of key levers 3, corresponding to the digits "1" to "9", inclusive, and co-operates with an arm 17 mounted on a rock shaft 18. Arms 19 carried on rock shafts 18 engage pins on links 20 and thereby actuate linkages in each of which the upper member, one of said links 20, is pivotally connected with two bell-cranks 21 which are also pivotally connected with a pin-depressing bar 22. The mechanism, so far described, is substantially the same as that disclosed in the patent to Hanson, No. 1,278,812, dated September 10, 1918.

Said linkages, when actuated by depression of the numeral keys, serve to depress or set pins 23, corresponding to the keys depressed, on selected register bars 24 of the proper denomination. The manner in which the pins are supported by the register bars will hereinafter be described.

Pins 23 are normally located out of alignment with depressing bars 22 and, in order to enable the setting of pins on register bars of the desired denominations, mechanism must be provided for effecting the selection of such register bars. To this end, the carriage 7 is provided with denomination-selecting dogs 25, mounted for pivotal and sliding movement on rod 26 and normally held by rack 27 against movement longitudinal with respect to rod 26.

Upon entering a computing zone, a tappet 28 on a selecting-dog 25 engages in turn jacks 29, pivotally supported at 30 in a hood 31. These jacks, acting through links 32, levers 33 pivoted at 34, transposition linkages 35, bell-cranks 36, and pins 37 on the register bars, cause the corresponding register bars to be advanced against the action of the usual springs 24* to bring their pins 23 into register or alignment with bars 22. This structure is substantially the same as that disclosed in the patent to Minton, 1,280,065, dated September 24, 1918.

In the embodiment of the invention herein disclosed, provision is made of two registers, having in common a single set of pin-setting linkages but having separate denomination-selecting means.

The usual dial wheels, comprised in each register, have associated therewith the usual one-way driving means, including pinions 38 meshing with racks 40 on register bars 24. Provision is also made of the usual carry-over devices mounted on shafts 41 and 42, of which shaft 42 is actuated in the usual manner through pinions 43 and 44 from rack 45 on the general operator 46. This mechanism is substantialy the same as that shown and described in said patent to Hanson, No. 1,278,812.

The general operator is provided with the usual cross-bar 47 through which movement of the register bars is effected. Normal actuation of the general operator is obtained in the usual manner by means of operating shaft 48 carrying a handle shown in dotted lines, gear segments 49, pinions 50, and racks 45 on said general operator.

The present invention provides complementary subtraction mechanism in which the numeral keys effect depression for subtraction of the same pins as for addition. To this end pins 23 are supported for the usual raised or depressed adjustment in pin-cages or frames 51 slidably mounted on register bars 24 by means of portions of said cages passing through slots 52 in said bars 24. The pin-cages 51 may also be referred to as pin-carriers. Normally each cage 51 is held in fixed position on its register bar by means of a latching device comprising a hook 53 mounted on the register bar and a latch proper 58 on the pin-cage. Hook 53 is pivotally supported at 54 on bar 24 and carries a pin 55 engaging in a slot 56 in bar 24, and consequently limiting the movement of hook 53 which is pressed upwardly by spring 57. Latch 58 has a hooked end normally engaging hook 53 and is pivotally supported at 59 in such a manner as to be held in either latching or released position. The end of latch 58 opposite the hook is provided with a heel 60 to be engaged by a linkage to be hereinafter described, which, at the time of subtraction setting, acts to depress special pins 23ª on all of the register bars. The forward end of each latch 58 overlies a shoulder 60ª on the subtraction pin 23ª associated therewith, to the end that restoration of a pin 23ª will effect movement of the corresponding latch to effective position in case it had been moved to ineffective position.

It will be seen that in performing addition, the general operator engages the index pins which have been set, and that performing subtraction, the general operator engages the special pins. Furthermore, in performing subtraction, the pin-cages, with the exception of that on the units bar, must in each case be advanced to the same extent as would be obtained with all of the "9" pins depressed. Preferably, bar 47 of the general operator is slotted to provide, in connection with each computing unit, a surface 47ª for engaging the depressed pins in performing addition and a surface 47ᵇ for engaging the special pins 23ª in performing subtraction. The distance between said surfaces 47ª and 47ᵇ is the same as that between the "9" pins and the special pins 23ª. Obviously two separate bars may be used in place of the slotted bar and said bars may be operated together or independently. It will be seen that the pin-carriers 51 with their index pins 23, their subtraction pins 23ª and their hooks or latches 58 constitute interponent devices to transmit the motion of the general operator 46 to the register bars in accordance with the settings of said pins and latches.

The latch-engaging linkage, just referred to, includes a lower bar 61 carrying on raised arms near its ends pins 61ª which engage in slots 62 in bell-cranks 63. Said bell-cranks are caused to move in unison by means of a bar 64 pivotally connected to said bell-cranks at their upper portions. Suitable guiding means are provided for bar 61. At the left side of the machine one of said bell-cranks 63 forms part of a bail 64ª mounted on shaft 65. Said bail, while normally held withdrawn from the pin-setting linkages, as will be pointed out later, is, at times, allowed to move about shaft 65 into a position such that it will be engaged and rocked by any of said pin-setting linkages actuated by a numeral key. Bar 61 is urged toward the left of the machine and upwardly by a spring 65ª connecting the upright arm at that end of bar 61 with an arm 66 secured to a fixed part of the frame.

Normally the latch-engaging linkage, which by its position, determines whether addition or subtraction is to be performed, is held in the position shown in Figure 4, with its lower bar in raised position and with the bail 64ª out of position to be engaged by the usual pin-setting linkages.

To control said latch-engaging linkage, provision is made of a shaft 67 carrying a lever 68 with its forward end 69 substantially parallel to said shaft 67. Pivotally connected at 70 with said forward end 69 is a latch member 71 provided with a shoulder 72 which normally engages pin 61ª. Member 71 is urged toward the right of the machine by a spring 73. The forward end of lever 68 is urged downwardly by a spring 74 connecting said forward end with an arm 75 on a rock shaft 76 extending across the machine. Lever 68 is, however, normally restrained from movement in response to the urging of spring 74 by engagement of a pin 77 on the rear arm thereof with a shoulder 78 on arm 75.

Figure 3:
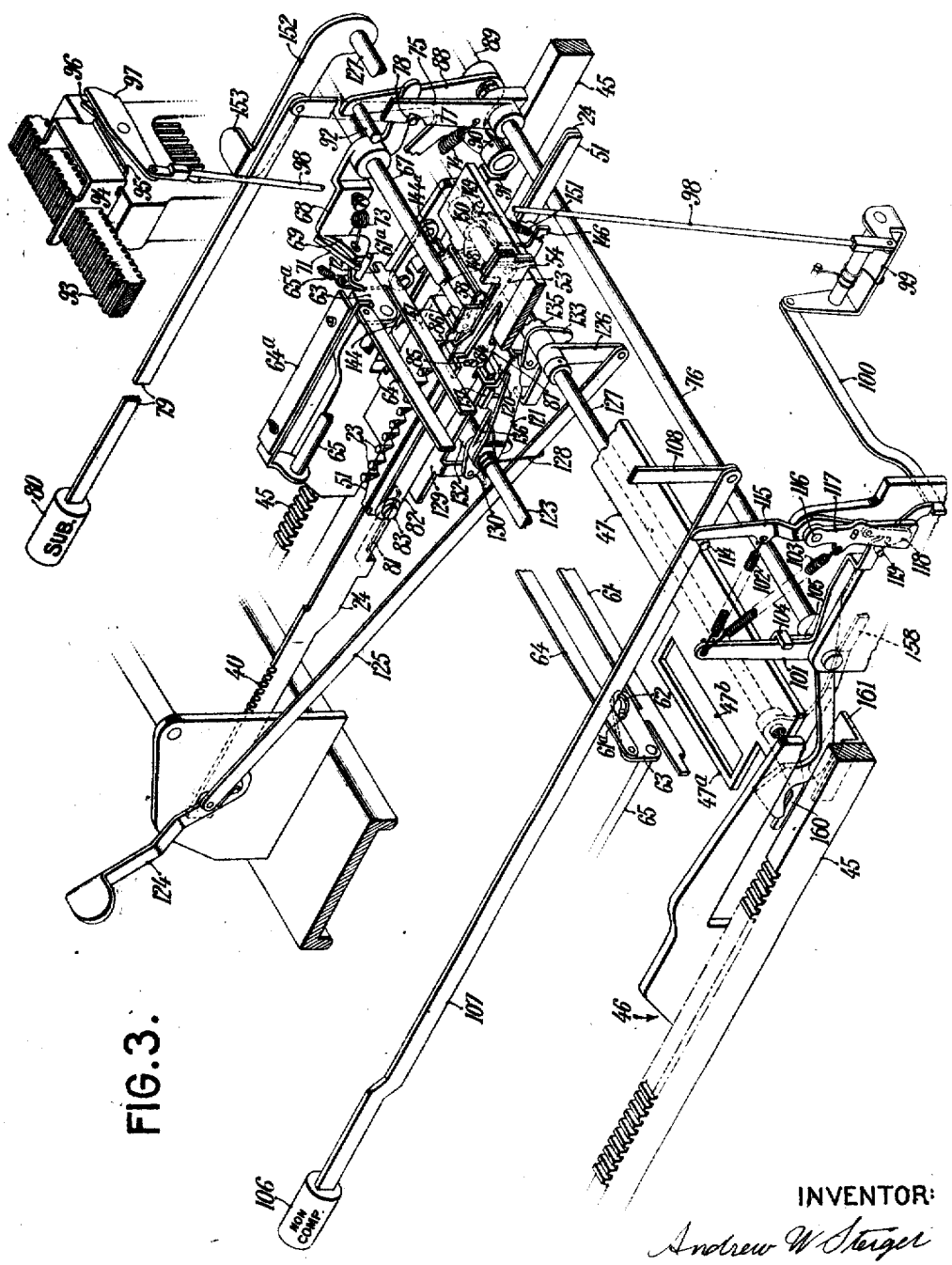
Figure 3 is a skeleton perspective view, showing the essential parts of the subtraction-setting device with its parts in ineffective position.

With lever 68 in this position, the parts will be maintained in the positions shown in Figure 4. Upon rocking shaft 76 by means of link 79 connected at one end with arm 75 and at the other with subtraction key 80, or by means of the automatic subtraction setting means shown in Figure 3, and which will hereinafter be described, lever 68 will be released. Upon such release, the parts will assume the positions shown in Figure 5 and at the same time set all of the special pins 23ª. Shoulder 72 on latch 71 will slip past pin 61ª and the parts will then assume the positions shown in Figure 6 with bail 64ª in position to be engaged by bell-cranks 21 of the pin-setting linkages.

Now, if a register bar is advanced by the denominational selecting means to bring the pins into alignment with the corresponding linkages and a numeral key is depressed, not only will the pin corresponding to the numeral key be depressed, but bail 64ª will be actuated and consequently bar 61 depressed to release the latch on the selected register bar. This condition is shown in Figure 11. Upon actuation of the general operator, bar 47 thereof will engage the depressed pin 23ª and move the pin-cage 51 until the pin corresponding to the numeral key depressed engages stop member or lug 81 and moves the register bar to turn the dial wheel. It will be seen that the idle movement of the pin-cage corresponds to the pin set up and that the driving or active movement corresponds to the complement of the pin set.

As is usual in machines arranged for complementary subtraction, it is necessary to provide means to give the units dial wheel an additional step. To this end, a bar 82 is pivotally connected to the units pin-cage 51 at 83 in such a manner that it will be held in raised or lowered position as set. Swinging movement of bar 82 with reference to the units register bar is limited by a pin 84 on the pin-cage projecting into a slot 85 at the rear end of said bar 82.

Bar 82 is also provided with an upwardly-extending lug 86 in position to be engaged by bar 61 upon subtraction setting. Such engagement will cause depression of the rear end of bar 82, so that shoulder 87 thereon will be engaged by surface 47ᵇ of bar 47 upon actuation of the general operator. It will be understood that shoulder 87 is positioned to the rear of the pin 23ᵃ of the units register bar a distance sufficient to give the necessary added movement to the units register bar and consequently to the units register wheel or dial wheel. Evidently, in view of the use of bar 82, the subtraction or special pin 23ᵃ on the units bar is not engaged by the general operator and has no driving function. This pin is, however, necessary to restore the latch on the units pin-cage to effective position.

It is also desirable to note the effect of depressing the "9" key during the operation of subtraction. All of the special pins 23ᵃ are depressed at the time of subtraction setting, so depression of the "9" linkage and the "9" pin on the pin-cage of the selected bar will not change the extent of movement of said pin-cage by the general operator. Actuation of the "9" linkage will, however, actuate bail 64ᵃ and consequently through bar 61 cause the release of the pin-cage on the selected register bar.

Upon return of the general operator to normal position, bar 47 will engage the usual lugs near the rear ends of register bars 24 and restore the same to the control of springs 24ᵃ.

Provision is also made for restoring the parts to normal position, that is, with the machine set for addition, upon operative movement of the general operator. For this purpose, a bell-crank 88 is mounted on a pin 89 substantially in alignment with shaft 76. At its lower end, bell-crank 88 is provided with a roll 90 normally resting in a recess 91 of the adjacent side bar of the general operator, and, at the end of the upright arm, with a pin 92 overlying the rearwardly-extending arm of the lever 68.

It is evident that forward movement of the general operator will cause roll 90 to rise out of recess 91 and ride on the top of the side bar. The upper arm of said bell-crank will at the same time be thrown to the rear and by engagement of pin 92 with the curved upper surface on the rear end of lever 68 will restore said lever to its normal position, and thereby permit spring 74 to draw arm 75 forward to position shoulder 78 over pin 77. The corresponding upward movement of the forward end of lever 68 will cause the parts to be restored to the position shown in Figure 4. In this upward movement, member 71 is permitted to slip past pin 61ᵃ by virtue of its pivotal support at 70 and yielding support by spring 73. During its rearward or return movement, the general operator, through mechanism to be described hereinafter, causes restoration to normal position of all pins 23 and 23ᵃ which had been set, and restoration to effective condition of all latch members 58 which had been moved to ineffective position. Obviously, the normal setting of the mechanism is for addition, inasmuch as subtraction setting must be effected before entering a computing zone and actuation of the general operator immediately resets the mechanism for addition.

As hereinbefore stated, provision is made of means whereby the subtraction-setting means may be thrown into action automatically. For this purpose, there is provided on the rack 93 carried by carriage 7 a subtraction stop or tappet 94, which is provided with an extension 95 extending for substantially a computing zone, and positioned to engage a dog 96 on lever 97 and rock said lever. The rocking of said lever 97 acts through link 98 and bail 99 to withdraw a latch 100 from beneath one arm of a bell-crank 101 loosely mounted on the shaft 76. To the other arm of said bell-crank are secured a pair of springs 102 and 103 which tend to rock bell-crank 101, normally held against movement by latch 100. When, however, the latch is withdrawn, bell-crank 101 will be rocked so that its upright arm will engage a lug 104 on an arm 105 secured to shaft 76 and thereby rock said shaft to set the mechanism for subtraction. The connection between bell-crank 101 and arm 105 is such as to permit manual operation of shaft 76 without disturbing bell-crank 101 and the mechanism controlling the same.

Provision is also made of a non-compute key 106 which, when actuated, acts through link 107 and bell-crank 108 to actuate arm 109 on shaft 110 to swing rearwardly rolls 112, mounted on arms 111, thereby lowering rolls 113 and consequently denomination-selecting dogs 25 out of operative relation with jacks 29. With the denominational control rendered ineffective, it is desirable to prevent automatic subtraction setting. To this end, provision is made of a pin 114, on link 107, engaging with a lever 115 pivoted at 116 and having attached thereto one end of spring 102. Mounted at 116 and connected with spring 103 is a plate 117 carrying a latch 118 adapted to engage pin 119 on bell-crank 101 and lock the same against movement under the urging of springs 102 and 103. Control of plate 117 by lever 115 is obtained by means of a pin in the latter projecting into a slot in the former. This control is such as to permit actuation of the non-compute key even if latch 118 is blocked by pin 119. This mechanism is substantially the same as that shown in the said patent to Minton, 1,280,065.

As a consequence of the setting for complementary subtraction of the same index pins as for addition, by resetting the special pins, and consequently latches 58 after a number has been set up for subtraction, operation of the general operator will cause the number instead of its complement to be run up in the register. Provision is made, therefore, for resetting the special pins 23ª, only, after the devices have been set for subtraction. For this purpose, a bail, comprising a pin-restoring bar 120 with arms 121 and 122 integrally attached thereto, is loosely mounted on shaft 123.

For effecting the restoration of the pins 23ª to normal position independently of pins 23, a lever 124 is pivoted at the front of the machine and connected by a link 125 to one arm of a bell-crank 126, the other arm of which underlies arm 121 of said bail. Said bell-crank 126 is loosely mounted on a shaft 127. The parts are urged away from pin-restoring position by means of a spring 128 coiled about shaft 123 and engaging at its ends arm 121 and link 125. It will be understood that each computing unit is provided with a device of this kind.

Inasmuch as the depression of the special or subtraction pins 23ª causes the same forward movement of the pin-carrying frames by the general operator as would be obtained by depressing all of the "9" pins, it is evident that complementary subtraction can be effected by a modified structure, in which the special pins 23ª are omitted, and the latching devices and additional pin-setting linkage are associated with the "9" pins. Without said special pins 23ª, however, resetting to run up additively the number, indexed with the mechanism set for subtraction, will not produce the desired result, for all of the "9" pins will be reset, and, therefore, the number run up in the register will differ from the number indexed if the digit "9" appears therein.

In order to use the restoring bar 120, it is necessary to provide the usual pin-restoring platform or plate 129 with a recess of such depth that bar 120 normally resting on the bottom of the recess will have its upper surface in the same plane as the upper surface of plate 129. Obviously, in the pin-restoring action of plate 129, bar 120 will act substantially as a part thereof. At its forward end, said plate 129 is pivotally supported on the substantially horizontal arms of small bell-cranks 130 and 131 secured to the ends of a sleeve 132 loosely mounted on shaft 123. At its other end, plate 129 is similarly supported on bell-cranks 133 and 134 secured to sleeve 135 loosely mounted on shaft 127. The pin-restoring action of plate 129 is effected through an arm 136 which engages an arm 137 secured to the bottom of plate 129.

Said arm 136 is actuated by shaft 123 on which it is fixed, and shaft 123 has fixed thereon at the left-hand side of the machine an arm 138 through which it is operated. At the left side of the machine, the side bar of the general operator is provided with a camming dog 139 pivoted at 140 on a bracket 141 fixed to said bar. A pin 142 limits the pivotal movement of camming dog 139 in one direction and the dog is normally held against said pin by a spring 143. Obviously, on the forward movement of the general operator, dog 139 will yield upon engagement with arm 138 and slip past said arm, but on the return movement, said dog will cam up arm 138 in passing and cause operation of the pin-restoring plates of all computing units.

Provision is also made for restoring all of the depressed pins in the various units independently of the action the general operator. To this end, an arm 144 of general L-shape is loosely mounted at one end on shaft 123. A lug 145 on arm 144 underlies arm 138 and provides such a connection that arm 138 may be actuated by arm 144 or independently thereof. The downwardly-extending leg of arm 144 is provided at its lower end with a notched offset portion 146 and on its rear side with an upwardly-facing shoulder 147. A collar 148 fixed on shaft 127 is provided with a pin 149 extending in a substantially rearward direction and with a downwardly-extending latch or pawl 150. A spring 151 connecting offset 146 to pin 149 tends to move upwardly the rear end of arm 144 and to rock shaft 127 so as to press latch or pawl 150 against the downwardly-extending portion of arm 144. When arm 144 is sufficiently depressed, pawl 150 will engage shoulder 147 and lock arm 144 against upward movement. To effect restoration of arm 144 to normal position, the general operator is provided with a cam member 144ª which upon forward movement of said general operator will engage arm 144, as shown in Figure 9, and depress the same sufficiently to restore it to the control of latch 150. At the left of the machine, shaft 127 is provided with an operating arm 152 fixed thereon.

Upon depression of a key 153 at the end of arm 152, shaft 127 will be rocked against the action of spring 151 and latch 150 withdrawn from shoulder 147. Under the tension of spring 151, which is of sufficient strength, arm 144 is thrown upwardly and through arm 138 and other connections effects the lifting of pin-restoring plates 129 in the various computing units.

Each computing unit is also provided with well-known mechanism in which key 154, when pressed down against the action of restoring spring 154ª, tensions spring 155 connected to the forward end of lever 156. At the end of the downward movement of key 154, a cam portion thereof trips latch member 157 and permits spring 155 to rock lever 156 and thereby cause the pin-restoring platform 129 to be lifted.

All of the pin-restoring devices herein disclosed have important functions in connection with the present form of computing mechanism, especially in view of the plurality of registers. The pin-restoring action effected by the general operator is usual in machines of this type.

The universal pin-restoring mechanism which becomes effective upon depression of key 153 is of particular value when a mistake has been made in indexing the number. Following the action of said universal mechanism and the consequent resetting of all of the pins, the correct number may be indexed and the computation effected.

As a safeguard to prevent improper actuation of shaft 127, either manually by means of key 153 or from any other cause, and consequent improper actuation of the universal pin-restoring mechanism during the operation of the general operator, provision is made of a locking device for said shaft. Said locking device, shown in Figures 1 and 3, comprises a lever or arm 158 fixed to shaft 127 and having its rear end normally resting on a fixed cross-bar 159, thus serving to limit the rotation of shaft 127 in a clockwise direction, as viewed in Figure 1. At its forward end, said lever 158 is provided with a horizontal extension 160 which, with said lever 158 in normal position, will permit the passage immediately thereunder of a shelf-like member 161 attached to the adjacent rack-bar of the general operator. As will be understood, extension 160 and member 161 are of such dimension as to effect locking of said shaft 127 during substantially the whole of the forward and return strokes of the general operator.

With a plurality of registers, it may be desirable to add in some, subtract in others, and to leave the remainder unchanged. To obtain this result, the machine is set for subtraction, either manually or automatically, and the desired number indexed. Operative movement of the general operator at this time would effect subtraction in all of the registers. If, however, lever 124 of any computing unit is depressed, bar 120, corresponding thereto, will act to restore subtraction pins 23ᵃ to normal positions, and thereby shift the pivoted latch members 58 to positions to engage hooks 53. Upon operative movement of the general operator, the number indexed will be run up additively in the corresponding register. Also, depression of key 154 of any computing unit will cause restoration of index pins 23 and subtraction pins 23ᵃ to normal position, and operative movement of the general operator will be ineffective relative to this computing unit.

In machines of this type, each set of index pins comprises nine pins and these are referred to by their numbers from front to rear. With mechanism such as disclosed in said Hanson and Minton patents, depression of the numeral keys when the machine is set for addition, will effect depression of pins having the same numbers as the keys depressed and corresponding to the number printed, but, upon setting for subtraction, the pins depressed will be those complementary to the pins having the same numbers as the keys depressed. For addition, then, the number is indexed on the pins, but, for subtraction, the number is not indexed on the pins although a setting thereof is obtained. In the machine herein disclosed, the same index pins are depressed for both addition and subtraction and the number is indexed in both cases.

Variations may be resorted to within the scope of the invention, and portions of the improvements may be used without others.

Having thus described my invention, I claim:

1. In a computing machine, the combination with a register, of operating means therefor, including a driving element for said register, numeral keys, indexing devices individual to said numeral keys mounted on said driving element, numeral-key-actuated devices for severally setting said indexing devices, means to bring said indexing devices and their respective setting devices from a normally inoperative into an operative relation with respect to each other, means to operate said driving element to an extent proportional to the value of the indexing device set, and means to modify the action of said operating means, whereby the operation of the driving element will be that normally obtained by setting the complementary indexing device.

2. In a computing machine, the combination with a register, including register wheels and pinions, one for each register wheel, having one-way driving connections therewith, of rack-bars meshing with said pinions, sets of index pins mounted in frames carried by said rack-bars, numeral keys, numeral-key-actuated devices for setting pins in accordance with the numeral keys depressed, means, including a general operator, for normally driving said rack-bars to extents corresponding to the pins set, and thereby actuating the register wheels, and subtraction mechanism effective to change the driving relation between said general operator, said pin-carrying frames, and said rack-bars, whereby operation of the general operator will effect rack-bar movements corresponding to pins complementary to those set.

3. In a computing machine, the combination with computing wheels, of bars for severally actuating said wheels, numeral keys, numeral-key-operated index devices set in accordance with the numeral keys depressed, means to actuate said index devices for actuating said wheel-actuating bars in accordance with the index devices set, and mechanism for modifying the action of the actuating means for said index devices, whereby said wheel-actuating bars will be actuated in accordance with a setting of said index devices complementary to that established.

4. In a computing machine, the combination with computing wheels, of driving bars therefor having one-way driving connections therewith, a set of indexing devices slidably mounted on each of said driving bars, a latch associated with each set of indexing devices, and normally effective to prevent movement of said set of indexing devices with reference to the corresponding driving bar, means to set said indexing devices, a general operator for engaging the indexing devices set, and thereby moving the driving bars to corresponding extents, subtraction-setting means, and means effective upon subtraction setting to cause release of the latch on each driving bar on which an indexing device is set to index a digit, and to change the driving relation between the general operator and said driving bar, so that the set of indexing devices will have an idle movement corresponding to the number of the indexing device set followed by an active movement to advance the driving bar an amount corresponding to the complement of the indexing device set.

5. In a computing machine, the combination with a register, including register wheel, of bars having a one-way driving connection with their respective register wheels, a pin-carrier having a single set of index pins associated with each of said bars, addition mechanism for actuating said pin-carriers and consequently said bars to run up additively on said register wheels the number indexed on said index pins, and subtraction mechanism including means for modifying the action of the addition mechanism for actuating said bars, to run up on said register wheels a number complementary to that indexed on said index pins.

6. In a computing machine, the combination with register wheels, of one-way driving means therefor, including bars, one for each register wheel, a series of settable index pins supported in a frame slidably mounted on each bar and normally locked against movement thereon, an operating element for engaging any index pin set, and thereby actuating the register bars to run up additively on said register wheels the number indexed, and subtraction mechanism, including means for releasing from the corresponding register bar each pin-supporting frame in which an index pin is set, whereby movement of said operating element will cause the number, complementary to that indexed on the pins, to be run up in the register.

7. In a computing machine, the combination with a register, including register wheels, of combined addition and subtraction mechanism, including register bars having actuating connections with each of said register wheels, a series of pins mounted on each register bar, means for indexing on said pins a number to be run up in said register, a general operator for actuating said register bars and their associated register wheels, means, rendered effective upon setting for subtraction, for modifying the driving relation between the general operator and the register bars by setting certain pins on all the register bars, and means operatively connected with said indexing means at such subtraction setting, for further modifying the driving relation between a register bar, on which a pin is indexed, and the general operator, so that operation of the latter will actuate the former to run up on the corresponding register wheel a number corresponding to the pin complementary to that set.

8. In a computing machine, the combination with a register, including register wheels, of actuating means for said register wheels, comprising a general operator and means for transmitting motion from said general operator to said register wheels, including a register bar, a frame carrying a set of index pins slidably mounted on said register bar, and latching means for holding said frame against movement relative to said register bar.

9. In a computing machine, the combination with a register, including indicating elements, of actuating means for said indicating elements, including a register bar, a frame carrying a set of index pins slidably mounted on said register bar, latching means for preventing movement of said frame on said bar, a stop on said bar in position to be engaged by a depressed pin on an unlatched frame after an idle movement of said unlatched frame corresponding to the number of the pin depressed, and means to actuate said frame.

10. In a computing machine, the combination with a register, of register bars having operative connection therewith, frames carrying sets of pins, slidably mounted on said register bars, latching devices normally holding said frames against movement on their respective register bars, means for selecting bars on which pins are to be set for indexing digits, numeral keys, numeral-key-actuated linkages for depressing pins on selected register bars, an additional linkage positioned to set certain pins on normally positioned register bars and to render latches ineffective on selectively positioned register bars, and having attached thereto a bail universal to said key-actuated linkages, a device for holding said additional linkage in inoperative position, and thereby holding said bail out of engagement with said key-actuated linkages, and means for moving said holding device to ineffective position and for effecting by such movement the setting of a certain pin in each frame.

11. In a computing machine, the combination with a register, of register bars having operating connections therewith, means for actuating said bars, devices, including index pins, for determining the operative relation between said actuating means and said register bars, linkages for setting said index pins, and a complementary subtraction device, comprising a linkage including two bell-cranks having slots extending longitudinally with respect to the horizontal arms thereof, a depressing bar having pins engaging in said slots, and a link connecting the upright arms of said bell-cranks to cause them to move together, a bail universal to said index-pin-setting linkages, spring means tending to move the depressing bar into position with its pins at the outer ends of said slots, and a device for normally holding said depressing bar with its pins at the inner ends of the slots and at the same time positioning said bell-cranks, so as to hold said bail withdrawn from operative position with respect to said linkages.

12. In a computing machine, the combination with computing wheels and actuating means therefor, including actuating bars having settable index pins mounted thereon, of means to restore to normal position pins which have been set comprising a plate supported for parallel movement, means for moving said plate to restore to normal position any pins which have been set, latching means for preventing operation of said plate-moving means, a spring for actuating said plate-moving means and holding said latching means in effective position, and means for rendering said latching means ineffective.

13. In a computing machine, the combination with means to index numbers including a set of index pins, of a device for restoring indexed pins to normal position, manually-controlled means for normally holding said device in inoperative position, and a spring for operating said restoring device and retaining said holding means normally in operative position.

14. In a computing machine, the combination with means to index numbers including settable index pins, of means to restore set pins to unset position comprising a member spring-pressed in a direction to cause pin-restoring action, means for holding said spring-pressed member against operative movement, and means including a general operator for restoring said spring-pressed member to latched condition.

15. In a computing machine, the combination with settable members, of means for restoring set members to normal position comprising a device movable toward member-restoring position, a pivotally-mounted arm having operative connections with said movable device, a detent for engaging said pivotally-mounted arm and holding it against operative movement, and a spring connecting said arm with said detent.

16. In a computing machine, the combination with a register wheel, of actuating means therefor including a bar, a series of settable index pins mounted in a frame slidable with respect to said bar, numeral-key-actuated means for setting said pins, and means for actuating said bar including means for moving said slidable frame a distance corresponding to the index pin of highest value, and a stop positioned on said bar to be engaged by an indexed pin after an idle movement of said slidable frame corresponding to the value of the indexed pin, whereby the bar will be actuated an amount corresponding to the complement of the pin indexed.

17. In a computing machine, the combination with a register including register units, of actuating members having one-way driving connections with their respective register units, a carrier having a single set of index devices associated with each of said actuating members, addition mechanism for operating said carriers and consequently said actuating members to run up additively on said register units the number indexed on said index devices, and subtraction mechanism for modifying the action of the addition mechanism for operating said actuating members to run up on said register units a number complementary to that indexed on said index devices.

18. In a computing machine, the combination with a register, of driving bars therefor, a set of index devices for each of said driving bars, a supporting frame for each set of index devices mounted for movement longitudinally of the corresponding driving bars, latching devices for preventing movement of the supporting frames with respect to the corresponding bars, means to drive each frame in accordance with the index device set, subtraction means including means to release the latching device for each frame in which an index device is set, a stop positioned on each of said driving bars in position to be engaged by a set index device after an idle movement of the corresponding frame proportional to the value of the index device set, and means to operate each of said frames an amount corresponding to the value of the highest index device in each set.

19. In a computing machine, the combination with a plurality of registers, of means individual to said registers for effecting complementary subtraction, each of said complementary subtraction means including indexing devices, means universal to all of said registers for indexing the number to be computed, operating means to effect registration of the computation, and devices individual to the registers to set the computing units for addition after the number has been indexed and prior to the operation of said operating means.

20. In a computing machine for performing complementary substraction, the combination with a register, of driving bars therefor, a set of indexing devices for each of said driving bars, a supporting frame for each of said sets mounted for sliding movement relative to the corresponding driving bar, latching devices normally effective for preventing movement of the supporting frames with respect to the corresponding driving bars, a stop on each driving bar in position to be engaged by a set indexing device after an idle movement of the corresponding frame proportional to the value of the indexing device, means to release the latching device for a frame in which an indexing device is set, an operating device for said frames, connections between said frames and said operating device whereby all of said frames will be driven an amount corresponding to the indexing devices of highest value, and means for setting the machine for addition after the indexing operation is completed, comprising means to restore to effective condition all latching devices which have been released, and means to change the driving relation between said supporting frames and said operating device, whereby the frames will be actuated in accordance with the indexing device set.

21. In a computing machine, the combination with a computing wheel, of actuating means therefor including a driving bar, a frame slidably mounted on said driving bar, a device for latching said frame in position on said bar including a latch member pivoted on said frame, a series of settable index pins supported in said frame, a special pin settably supported in said frame and having a shoulder underlying the forward end of said latch member, a two-part general operator having an edge to engage a depressed index pin when the special pin is in ineffective position, and a second engaging edge spaced to the rear of said forward edge a distance equal to that between the index pin of highest value and the special pin for engaging said special pin when operatively positioned.

22. In a computing machine, the combination with a register including a computing unit, of actuating means for said computing unit including an actuating member, a series of settable index devices mounted on a movable frame, numeral-key-actuated means for setting said index devices, and actuating-member-operating means, including means for moving said frame a distance corresponding to the index device of highest value, and means for effecting driving connection between said actuating member and said frame after an idle movement of the latter corresponding to the value of the index device set.

23. In a computing machine, the combination with a computing member, of actuating means therefor comprising a reciprocable bar, a frame slidably mounted with respect to said bar, settable pins carried by said frame, latching means to hold said frame against movement relative to said bar, said latching means including a member movable to and from a position to render said latching means effective, and operative connections between one of said pins and said movable member, whereby setting of said pin will not effect an unlatching movement of said movable member, but restoration of said pin to normal position will effect restoration to operative position of said movable member if in an inoperative position.

24. In a computing machine, the combination with a computing member, of means to actuate said computing member including a reciprocable bar, settable pins mounted in a frame slidably supported relatively to said bar, a pivoted latch member on said frame adjacent the rearmost pin and having a portion overlying the portion of said rearmost pin, permitting depression of said rearmost pin without depression of said latch member, but insuring restoration of the latch member, if in depressed position, upon restoration of the associated pin, and means on said bar for engagement by said pivoted latch member.

25. In a computing machine, the combination with a set of movable frames, each of said frames carrying a series of settable index pins and a settable subtraction pin, of means including a movable member for restoring to raised position all depressed subtraction pins, means including a movable plate for restoring to raised position all depressed index pins, and means operated by said movable plate for effecting restoring movement of said movable member.

26. In a computing machine, the combination with a plurality of registers, of mechanism for performing either addition or complementary subtraction comprising an actuating device for each of said registers including a set of index devices, means universal to all sets of index devices for indexing thereon the number to be computed, means individual to each of said actuating devices to set the same for addition after the number has been indexed with the machine set for subtraction, a general operator, and general operator-actuated means for restoring all of the index devices to normal position and setting the machine for addition.

27. In a computing machine, the combination with a plurality of registers, of mechanism for performing either addition or complementary subtraction comprising an actuating device for each of said registers including a set of index devices, means universal to all sets of index devices for indexing thereon the number to be computed, means individual to each of said actuating devices to set the same for addition after the number has been indexed with the machine set for subtraction, and manually controlled means for restoring to normal position all of said index devices which have been set.

28. In a computing machine, the combination with a plurality of registers, of mechanism for performing either addition or complementary subtraction comprising an actuating device for each of said registers including a set of index devices, means universal to all sets of index devices for indexing thereon the number to be computed, means individual to each of said actuating devices to set the same for addition after the number has been indexed with the machine set for subtraction, and means individual to each set of index devices for restoring to normal position all of the actuated index devices of any selected set.

29. In a computing machine, the combination with a plurality of registers, of complementary subtraction mechanism comprising an actuating device for each of said registers including a set of index devices, means to index on all of said sets of index devices the number to be computed, means individual to each of said actuating devices to set the same for addition after the number has been indexed, and means individual to each of said actuating devices to restore to normal condition the index devices forming a part thereof.

30. In a computing machine, the combination with a series of reciprocable bars, each having a latch member, of a series of frames slidably mounted thereon, each of said frames having mounted thereon settable index pins, a settable special pin, a pivoted latch having its rear end shaped to engage the latch member on the corresponding reciprocable bar and its forward end adjacent to said special pin, index-pin-setting linkages, a special pin-depressing bar normally held out of operation, and subtraction-setting means for actuating said special pin-depressing bar to depress all of said special pins and place said special pin-depressing bar under the control of a device universal to said index-pin-setting linkages, for moving to inoperative position the pivoted latch on a frame simultaneously with the setting of an index pin in that frame.

31. In a computing machine, the combination with a numeral key, of a series of numeral-key-actuated linkages, an additional linkage comprising bell cranks, a connection to cause said bell cranks to move in unison, a link supported on arms of said bell cranks for movement to and from the outer ends of said arms, a bail universal to said numeral-key-actuated linkages connected to one of said bell cranks, and means for moving said link toward the inner ends of the supporting arms of said bell cranks and concomitantly withdrawing said bail from position to co-operate with said numeral-key-actuated linkages.

32. The combination with computing mechanism settable for addition or subtraction, of controlling means therefor including a pivoted lever having an upwardly curved rear arm provided with a pin, a subtraction setting shaft, an arm fixed thereon and provided with a notch to engage said pin to hold the rear arm of said lever in depressed position, and a spring secured at one end to said arm and at the other end to the forward arm of said lever.

33. The combination with computing means for performing either addition or subtraction, of a pivoted lever co-operating at its forward end with said computing means for setting the same, and having an upwardly curved rear arm, spring means tending to depress the forward arm of said lever, latching means normally restraining said lever from movement to produce depression of its forward arm, means to restore said lever to the control of the latching means, comprising a bell crank having a pin engaging the upwardly curved rear arm of said lever, a general operator, and general operator actuated means for actuating said bell crank and thereby placing said pivoted lever under the control of said latching means.

34. In a computing machine, the combination with a register, of actuating means therefor including a reciprocable bar, a frame slidably mounted thereon, a series of settable index pins, a settable subtraction pin mounted in said frame, a latch member pivoted on said frame, said latch member being formed at its rear end to have latching engagement with said bar and at its forward end to overlie a shoulder on said subtraction pin, a series of pin-setting bars normally out of alignment with said index pins, an actuating bar normally in alignment with said subtraction pin, and means to bring said index pins into alignment with said index-pin-setting bars and the forward end of said latch member into alignment with said actuating bar.

35. In a computing machine, the combination with a register, of means for effecting registration therein comprising a set of index devices, means to index numbers thereon, operating mechanism for running up additively in said register the number indexed, means for causing said operating mechanism to run up additively in the register the complement of the number indexed, including means to set up a connection between certain of said index devices and said operating mechanism to enable said operating mechanism to give each of these index devices a movement in accordance with the highest digit which can be indexed thereon, and means effective upon indexing digits in the various index devices to change the connection between said index devices and the operating mechanism to cause each of said index devices to have an idle movement corresponding to the setting of said device followed by an active movement corresponding to the complementary setting of said device.

36. The combination with a system of computing wheels and actuating means therefor, including bars individual to said computing wheels and movable devices, each of which is normally connected to the respective bar to move therewith, of a subtraction mechanism including means to advance one of said movable devices ten steps and the others nine steps at each subtraction operation, and means to cause idle movement of any desired number of steps between any movable device and the corresponding bar.

37. The combination with a system of computing wheels and actuating means therefor, including bars individual to said computing wheels, movable devices for severally actuating said bars, and connections between the bars and the corresponding movable devices normally acting to effect a movement of the bar equal to that of the movable device, of subtraction mechanism including means to advance one of said movable devices ten steps and each of the others nine steps, and means to cause an idle movement of any desired number of steps between certain of said movable devices and the corresponding bars.

38. In a computing machine, the combination with a register, of actuating means therefor comprising a reciprocable bar having a latching element thereon, a frame slidably mounted on said bar, a series of settable index pins, a settable subtraction pin, and a pivoted latch carried by said frame, one end of said latch being shaped to engage said latching element on said bar, and the other being positioned to overlie a shoulder on said subtraction pin, and a stop on said bar positioned to be engaged by a depressed index pin after an idle movement of the frame corresponding to the pin depressed.

39. In a computing machine, the combination with a register, of actuating means therefor comprising a frame carrying a series of index pins at regular steps apart, a settable subtraction pin spaced to the rear of said index pins, and a pivoted latch having its forward end overlying a shoulder on said subtraction pin and having a hook at its rear end, a reciprocable bar on which said frame is slidably mounted, a device said with which said hook co-operates for holding said frame latched in rear position on said bar, and a stop on said bar one step in advance of the first index pin when the frame is in latched position.

40. In a computing machine, the combination with a register, of actuating means therefor comprising a frame carrying a series of index pins at regular steps apart, a settable subtraction pin spaced to the rear of said index pins, and a latch having its forward end overlying a shoulder on said subtraction pin and having a hook at its rear end, a reciprocable bar on which said frame is slidably mounted, a device with which said hook co-operates for holding said frame latched in rear position on said bar, a stop on said bar one step in advance of the first index pin when the frame is in latched position, and a bar supported on said frame for limited elevation and depression, said bar having a shoulder one step to the rear of said subtraction pin.

41. In a computing machine, the combination with a register, of actuating means therefor including a slidably mounted frame carying a series of index pins at regular intervals apart, and a settable special pin spaced to the rear of said index pins, and a general operator including a bar having a longitudinal slot, the distance between the forward edge of said bar and the rearward edge of the slot being equal to the distance between the special pin and the index pin of highest value.

42. In a computing machine, the combination with a computing device, of actuating means therefor including a slidably mounted frame carrying a series of settable index pins at regular steps apart, a settable special pin spaced to the rear of said index pins, and a pivoted locking member having its forward end associated with said special pin to be lifted thereby from a depressed position and having a latch at its rear end, a member with which said latch co-operates when in depressed position, a general operator bar having a longitudinal slot supplying a pin-engaging edge at a distance to the rear of the forward edge of said bar, equal to the distance between the special pin and the rearmost index pin, and a bar mounted for movement through said slot to restore the depressed special pin and the inoperatively positioned locking member to normal position.

43. In a computing machine, the combination with a register, of actuating means therefor comprising a general operator and preliminary representation devices including numeral keys, numeral-key-actuated linkages, an independent linkage comprising a lower bar carrying pins at its ends, bell cranks with vertical and horizontal arms, said horizontal arms having slots to receive said pins, and a bail connected to one of said bell cranks universal with respect to said numeral-key-actuated linkages, means to move said pins to the inner ends of said slots and withdraw said bail from operative position, including a lever pivoted on a transverse axis and having its forward end brought into parallelism with said axis, a latch member pivoted on the forward end of said lever and urged into position to engage the adjacent one of said pins, said latch member having an inclined upper edge to engage said pin and thereby move the pins to the inner ends of said slots, and a downwardly facing shoulder to engage said pin and move the same downwardly in restoring said lower bar and said bail to operative positions.

44. In a computing machine settable for addition or subtraction, the combination with a series of reciprocable bars, of actuating means therefor, comprising a general operator, a frame slidable on each of said bars, a set of index pins and a subtraction pin settably mounted in each of said frames, means including a latch member pivoted on each of said frames for normally preventing relative movement between the frame and the corresponding bar, means for setting the same index pins either for addition or subtraction, and means effective upon setting for subtraction to depress all of the subtraction pins and thereafter to move to ineffective position the latch member on any bar simultaneously with the setting of an index pin thereon.

45. In a computing machine, the combination with a plurality of registers, of mechanism for selectively performing either addition or complementary subtraction comprising an actuating device for each of said registers including a set of index devices, means universal to all sets of index devices for indexing thereon the number to be computed, means individual to each of said actuating devices to set the same for addition after the number has been indexed with the machine set for subtraction, and a general operator to drive said index devices and thereby effect in said registers addition or complementary subtraction of the number indexed.

46. In a computing machine, the combination with a computing device, of a slidably mounted frame carrying a series of settable index pins, a settable special pin, and a pivoted locking member having its forward end associated with said special pin to be lifted thereby from the depressed position and having a latch at its rear end, a slidably mounted bar adjacent said frame, a member on said bar with which said latch co-operates when in a depressed position, a general operator bar for engaging index pins which have been set, and a second general operator bar for engaging the special pin when set, the forward edges of the respective general operator bars being spaced apart a distance equal to that between the special pin and the nearest index pin.

47. In a computing machine, the combination with a register, of reciprocable driving bars therefor, frames slidably mounted thereon, means to lock said frames against movement on their respective bars, including pivoted latch members on said frames provided with hooks at their rear ends, and co-operating members on the driving bars, settable index pins and a settable subtraction pin mounted on each frame, each subtraction pin having a shoulder underlying the forward end of the corresponding pivoted latch member, numeral keys, numeral-key-actuated linkages positioned in advance of the corresponding index devices, an additional linkage positioned over said special pins, a device universal to said numeral-key-actuated linkages for actuating said additional linkage, and means to render said additional linkage ineffective and to withdraw said universal device from effective position with respect to said key-actuated linkages.

48. The combination with typewriter mechanism including numeral keys, of computing means comprising reciprocable bars, frames slidably mounted thereon, groups of settable index pins on said frames, numeral-key-actuated means for printing a digit and concomitantly setting up the same index pin for either addition or subtraction, means to effect addition including means to lock the respective bars and frames against relative movement, and to effect a movement thereof proportional to the pins depressed, and means to effect subtraction, comprising means to move all of said frames a fixed distance and to cause a relative displacement between each bar and the corresponding frame in proportion to the value of the pin set in that frame.

49. In a computing machine, the combination with a plurality of registers, of actuating devices therefor including a set of actuating bars for each of said registers and settable pins thereon, a general operator, means individual to each register to restore to normal position pins which have been set, a manually operable pin-restoring device universal to said registers, and means to prevent actuation of said universal pin-restoring device during the operation of the general operator.

50. In a computing machine having a plurality of registers, the combination with a set of number-wheels for each register, of means for concomitantly actuating all of said sets of number-wheels whereby either addition or complementary subtraction may be effected in any set irrespective of the forms of computation effected in the other sets, said actuating means comprising a plurality of pin carriers, one for each number-wheel, a single set of pins on each of said carriers settable to index the digits of numbers to be computed, a general operator to actuate the pin-carriers to effect computation concomitantly in all of the registers, and means for indexing a number on the pin-carriers for all of said sets of number-wheels concomitantly and determining the form of computation to be effected when the pin-carriers are actuated by the general operator, said indexing and determining means comprising for each digit a single pin-setting bar extending across all of the pin-carriers for setting concomitantly the corresponding pins on the corresponding pin-carriers for each set of number-wheels irrespective of the forms of computation to be effected in the different registers.

51. In a computing machine having a plurality of registers, the combination with a set of number-wheels for each register, of means for concomitantly actuating all of said sets of number-wheels whereby either addition or complementary subtraction may be effected in any set irrespective of the forms of computation effected in the other sets, said actuating means normally set for addition and comprising a plurality of pin-carriers, one for each number-wheel, a single set of pins on each of said carriers settable to index the digits of numbers to be computed, a general operator to actuate the pin-carriers to effect computation concomitantly in all of the registers, means for indexing a number on the pin-carriers for all of said sets of number-wheels concomitantly and determining the form of computation to be effected when the pin-carriers are actuated by the general operator, said indexing and determining means comprising for each digit a single pin-setting bar extending across all of the pin-carriers for setting concomitantly the corresponding pins on the corresponding pin-carriers for each set of number-wheels irrespective of the forms of computation to be effected in the different registers, means for setting said actuating means for subtraction, and means including devices individual to said registers whereby said actuating means after being set for subtraction may be caused to effect addition in selected registers.

52. In a computing machine having a plurality of registers, the combination with a set of number-wheels for each register, of means for concomitantly actuating all of said sets of number-wheels whereby either addition or complementary subtraction may be effected in any set irrespective of the forms of computation effected in the other sets, said actuating means being normally set for addition and comprising a plurality of pin-carriers, one for each number-wheel, a single set of pins on each of said carriers settable to index the digits of numbers to be computed, a general operator to actuate the pin-carriers to effect computation concomitantly in all of the registers, means for indexing a number on the pin-carriers for all of said sets of number-wheels concomitantly and determining the form of computation to be effected when the pin-carriers are actuated by the general operator, said indexing and determining means comprising for each digit a single pin-setting bar extending across all of the pin-carriers for setting concomitantly the corresponding pins on the corresponding pin-carriers for each set of number-wheels irrespective of the forms of computation to be effected in the different registers, and means including devices individual to said registers for causing subtraction to be effected in some registers and addition in others.

53. In a computing machine having a plurality of registers, the combination with a set of number-wheels for each register, of means for concomitantly actuating all of said sets of number-wheels whereby either addition or complementary subtraction may be effected in any set irrespective of the forms of computation effected in the other sets, said actuating means being normally set for effecting computation in one form and comprising a plurality of pin-carriers, one for each number-wheel, a single set of pins on each of said carriers settable to index the digits of numbers to be computed, a general operator to actuate the pin-carriers to effect computation concomitantly in all of the registers, means for indexing a number on the pin-carriers for all of said sets of number-wheels concomitantly and determining the form of computation to be effected when the pin-carriers are actuated by the general operator, said indexing and determining means comprising for each digit a single pin-setting bar extending across all of the pin-carriers for setting concomitantly the corresponding pins on the corresponding pin-carriers for each set of number-wheels irrespective of the forms of computation to be effected in the different registers, and means individual to said registers, whereby computation of the form, other than that normally effected, may be effected.

54. In a computing machine, in combination, a register comprising number-wheels, and actuating means for said number-wheels having one-way connections therewith to effect addition or complementary subtraction, said actuating means comprising pin-carriers, one for each wheel and having a single set of settable index pins thereon, a general operator for actuating said pin-carriers to turn said wheels, and means for setting said index pins and determining which form of computation is to be effected, whereby, for a given number, exactly the same index pins will be set for both addition and subtraction.

55. In a computing machine, in combination, a plurality of registers, each comprising a plurality of number-wheels, and actuating means for said number-wheels having one-way connections therewith to effect addition or complementary subtraction, the form of computation to be effected in any one of said registers being entirely independent of that effected in any other register, said actuating means comprising pin-carriers, one for each wheel and having a single set of settable index pins thereon, a general operator for actuating said pin-carriers to turn said wheels, and means for setting said index pins and determining which form of computation is to be effected in each of the registers, whereby for a given number the corresponding index pins in the pin-carriers for the different sets will be set irrespective of the forms of computation to be effected in the various registers.

56. In a computing machine, in combination, number-keys, one for each digit, a plurality of registers, each comprising a plurality of number-wheels, and actuating means for said number-wheels having one-way connections therewith to effect addition or complementary subtraction, the form of computation to be effected in any one of said registers being entirely independent of that effected in any other register, said actuating means comprising pin-carriers, one for each wheel and having a single set of settable index pins thereon, a general operator for actuating said pin-carriers to turn said wheels, and means for setting said index pins and determining which form of computation is to be effected in each of the registers, said setting and determining means comprising a transverse bar for each number-key extending across all of said pin-carriers, whereby for a given number the corresponding index pins in the pin-carriers for the different sets will be set irrespective of the forms of computation to be effected in the various registers.

57. In a computing machine, the combination with a set of computing wheels, of actuating devices, one for each computing wheel and having a one-way connection therewith, a general operator, and general-operator-actuated interponent devices settable for driving said actuating devices to effect addition or complementary subtraction, each of said interponent devices having a single set of index pins settable to index the corresponding digit of a number to be computed, the same index pins being set for the same number irrespective of the form of computation to be effected.

58. In a computing machine, the combination with a set of computing wheels, of computation bars, one for each computing wheel and having a one-way connection therewith, a general operator, and general-operator-actuated interponent devices settable for driving said bars to effect addition or complementary subtraction, each of said interponent devices having a single set of index pins settable to index the corresponding digit of a number to be computed, the same index pins being set for the same number irrespective of the form of computation to be effected, each of said interponent devices also having a special pin which, when set for subtraction, will be engaged by the general operator and a uniform movement of all of said interponent devices effected.

59. In a computing machine, the combination with a set of computing wheels, of computation bars, one for each computing wheel and having a one-way connection therewith, a general operator, general-operator-actuated interponent devices settable for driving said bars to effect addition or complementary subtraction, each of said interponent devices having a single set of index pins settable to index the corresponding digit of a number to be computed, the same index pins being set for the same number irrespective of the form of computation to be effected, each of said interponent devices also having a special pin which, when set for subtraction, will be engaged by the general operator and a uniform movement of all of said interponent devices effected, and a latch for normally holding each interponent device against movement relative to its computation bar, said latch being released when a digit is indexed for subtraction on the same interponent device.

60. In a computing machine, the combination with a set of computing wheels, of computation bars, one for each computing wheel and having a one-way connection therewith, a general operator, general-operator-actuated interponent devices settable for driving said bars to effect addition or complementary subtraction, each of said interponent devices having a single set of index pins settable to index the corresponding digit of a number to be computed, the same index pins being set for the same number irrespective of the form of computation to be effected, each of said interponent devices also having a special pin which, when set for subtraction, will be engaged by the general operator and a uniform movement of all of said interponent devices effected, a latch for normally holding each interponent device against movement relative to its computation bar, said latch being released when a digit is indexed for subtraction on the same interponent device, and a projection on each computation bar to be engaged by a set index pin on the corresponding interponent device after an idle movement corresponding to the value of the pin set.

61. In a computing machine, the combination with a set of computing wheels, of computation bars, one for each computing wheel and having a one-way connection therewith, a general operator, general-operator-actuated interponent devices settable for driving said bars to effect addition or complementary subtraction, each of said interponent devices having a single set of index pins settable to index the corresponding digit of a number to be computed, the same index pins being set for the same number irrespective of the form of computation to be effected, each of said interponent devices also having a special pin which, when set for subtraction, will be engaged by the general operator and a uniform movement of all of said interponent devices effected, and a latch for normally holding each interponent device against movement relative to its computation bar, said latch being released when a digit is indexed for subtraction on the same interponent device, each special pin and the corresponding latch being so related that restoration of the special pin to normal position will cause said latch to be restored to normal position.

62. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed, and pin-setting devices universal to said interponent devices for setting the index pins in the same manner on the interponent devices for the different sets of computing wheels irrespective of the forms of computation to be effected in the latter.

63. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed, and pin-setting devices comprising a single set of digit-indexing bars extending across all of said interponent devices for setting the index pins in the same manner on the interponent devices for the different sets of computing wheels irrespective of the forms of computation to be effected in the latter.

64. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed, pin-setting devices universal to said interponent devices for setting the index pins in the same manner on the interponent devices for the different sets of computing wheels irrespective of the forms of computation to be effected in the latter, a latch to connect each interponent device with the corresponding computation bar, and means universal to all of said pin-setting devices, while indexing for subtraction is being effected, for releasing the latch for any interponent device concomitantly with the setting of an index pin thereon.

65. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed and a special pin adjacent the index pin of highest value, means to set all of the special pins when subtraction is to be effected, and pin-setting devices universal to said interponent devices for setting the index pins in the same manner on the interponent devices for the different sets of computing wheels irrespective of the forms of computation to be effected in the latter, actuation of the interponents for addition being effected by engagement of the general operator with the set index pins and for subtraction being effected by engagement of the general operator with the special pins.

66. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed and a special pin adjacent the index pin of highest value, means to set all of the special pins when subtraction is to be effected, pin-setting devices universal to said interponent devices for setting the index pins in the same manner on the interponent devices for the different sets of computing wheels irrespective of the forms of computation to be effected in the latter, actuation of the interponents for addition being effected by engagement of the general operator with the set index pins and for subtraction being effected by engagement of the general operator with the special pins, a latch to connect each interponent device with the corresponding computation bar, and means universal to all of said pin-setting devices, when indexing for subtraction is being effected, for releasing the latch for any interponent device concomitantly with the setting of an index pin thereon.

67. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed and a special pin adjacent the index pin of highest value, means to set all of the special pins when subtraction is to be effected, pin-setting devices universal to said interponent devices for setting the index pins in the same manner on the interponent devices for the different sets of computing wheels irrespective of the forms of computation to be effected in the latter, actuation of the interponents for addition being effected by engagement of the general operator with the set index pins and for subtraction being effected by engagement of the general operator with the special pins, and means for restoring the set special pins on the interponents associated with one set of computation bars, thereby restoring an addition setting for the parts associated with the corresponding set of computing wheels.

68. In a machine of the class described, the combination with a plurality of sets of computing wheels, of corresponding sets of computation bars, one of said computation bars for each computing wheel and having a one-way connection therewith, a general operator for all of said computation bars, general-operator-actuable interponent devices settable for driving said bars for selectively effecting addition or complementary subtraction in the different sets of computing wheels, each of said interponent devices having a single set of index pins settable to index the corresponding digit of a number to be computed, a special pin adjacent the index pin of highest value, and a latch to hold the interponent device fixed relatively to the corresponding computation bar, means for setting all of said special pins before indexing for subtraction is effected, pin-setting devices universal to said interponent devices for setting the index pins in the same manner on the interponent devices for the different sets of computing wheels irrespective of the forms of computation to be effected in the latter, means, universal to said pin-setting devices and rendered effective concomitantly with the setting of the special pins, for releasing a latch each time an index pin is set on the corresponding interponent device, and means for resetting the interponents of a set of computation bars for addition after a subtraction indexing has been completed, said resetting means comprising a device to reset the special pins, the relation of the latches to the special pins being such that the resetting movement of the special pins will cause a resetting of the corresponding latches.

69. In a computing machine, the combination with a register, including register wheels, of actuating means for said register wheels to effect either addition or complementary subtraction, said actuating means comprising a general operator and means for transmitting motion from said general operator to each of said register wheels, including a reciprocable transmission element carrying a single set of index pins and a special pin settable in connection with subtraction indexing, the actuating means being reset for addition by restoring said special pins to normal position.

70. In a computing machine, the combination with a register, including register wheels, of actuating means for said register wheels to effect either addition or complementary subtraction, comprising a general operator and means for transmitting motion from said general operator to each of said register wheels, including a register bar, a frame carrying a set of index pins slidably mounted on said register bar, latching means for holding said frame against movement relative to said register bar, and means for releasing the latching means for said frame when an index pin is set thereon.

71. In a machine of the class described, the combination with a plurality of registers, of register bars having operative connection therewith, frames, each carrying a single set of index pins and a special pin slidably mounted on said register bars, latches normally holding said frames fixed on said bars, means for selecting bars on which pins are to be set for indexing digits, a single set of transverse bars for concomitantly setting pins on selected bars, an additional setting bar to set the special pins on the normally-positioned register bars and to render the latches ineffective on selectively-positioned bars, a normally-ineffective actuator for said additional bar, and means to actuate said additional bar to set all of the special pins and to render said actuator effective, so that, upon actuation of any pin-setting bar, said additional bar willl be actuated for latch-releasing.

72. In a computing machine, the combination with computing wheels and actuating means therefor, including actuating bars having settable index pins mounted thereon and a general operator for said bars, of means to restore to normal position pins which have been set comprising a plate supported for parallel movement, means for moving said plate to restore to normal position any pins which have been set, latching means for preventing operation of said plate-moving means, a spring for actuating said plate-moving means and holding said latching means in effective position, releasing means for rendering said latching means ineffective, and general-operator-controlled means to lock said releasing means when the general operator is actuated.

73. In a computing machine, the combination with means to index numbers including a set of index pins and a general operator for effecting computation in all denominations, of a device for restoring indexed pins to normal position, manually-controlled means for normally holding said device in inoperative position, a spring for operating said restoring device and retaining said holding means normally in operative position, and general-operator-controlled means for locking said holding means against release.

74. In a computing machine, the combination with a plurality of registers, of computing units individual to said registers for effecting addition or complementary subtraction, each of said units including index devices, means universal to all of said registers to index on said devices, for one form of computation, the number to be computed, operating means to effect registration of the computation in all of said registers concomitantly, and devices individual to said units to set any unit to the other form of computation prior to the operation of said operating means.

75. In a computing machine, the combination with a set of movable frames, each of said frames carrying a series of settable index pins and a settable subtraction pin, of a general operator to actuate said frames, and means including a movable member for restoring to raised position all depressed subtraction pins, said general operator when shifted from its normal position serving to prevent actuation of said movable member.

76. In a computing machine, the combination with a set of movable devices, each of said devices carrying a series of settable index pins and a settable subtraction pin, of means including a movable member for restoring to raised position all depressed subtraction pins to cause addition instead of subtraction to be effected by said devices.

77. In a computing machine, in combination, a set of denominational members each carrying a plurality of settable pins, a spring device normally under tension for restoring all set pins to their normal positions, and means for releasing said spring device to cause such resetting.

78. In a computing machine, in combination, a set of denominational members each carrying a plurality of settable pins, a spring device normally under tension for restoring all set pins to their normal positions, a latch normally preventing the operation of said spring device, and means to release said latch.

79. In a computing machine, in combination, a set of denominational members carrying a plurality of settable pins, a general operator for operating all of said members, a spring device to restore all set pins to normal position, a latch to restrain said spring device, means to release the latch, and general-operator-actuated means to restore said spring device to control by said latch.

80. In a computing machine, in combination, a plurality of sets of denominational members, each member of said sets carrying a plurality of settable pins, a spring device for each of said sets of denominational members normally set for restoring the set pins to normal position, a latch for each of said spring devices, and means for releasing all of said latches concomitantly.

81. In a computing machine, in combination, a plurality of sets of denominational members, each member of said sets carrying a plurality of settable pins, a spring device for each of said sets of denominational members normally set for restoring the set pins to normal position, a latch for each of said spring devices, means for releasing all of said latches concomitantly, and general-operator-actuated means for resetting each of said spring devices.

ANDREW W. STEIGER.

Witnesses:
JOSEPH P. KENNEDY,
MARGARET REARDON.